Figure 1:
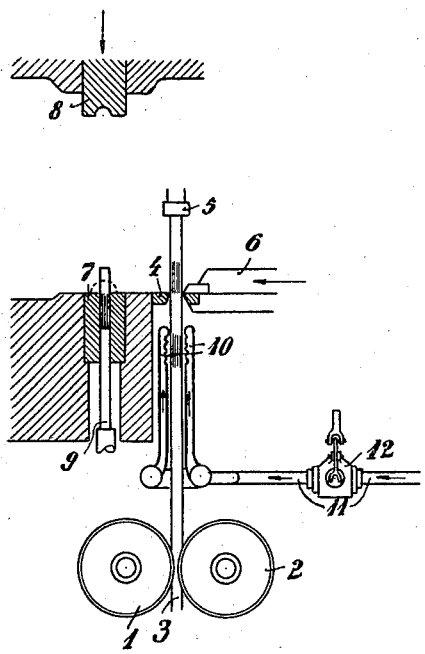

H. MÜLLER.
ART OR PROCESS OF MANUFACTURING BOLTS, RIVETS, AND SIMILAR ARTICLES.
APPLICATION FILED JAN. 4, 1912.

1,029,395.

Patented June 11, 1912.

Witnesses.

Inventor:

UNITED STATES PATENT OFFICE.

HANS MÜLLER, OF HAGEN, GERMANY.

ART OR PROCESS OF MANUFACTURING BOLTS, RIVETS, AND SIMILAR ARTICLES.

1,029,395. Specification of Letters Patent. Patented June 11, 1912.

Application filed January 4, 1912. Serial No. 669,495.

*To all whom it may concern:*

Be it known that I, HANS MÜLLER, engineer, a citizen of the German Empire, residing at Hagen, in the Province of Westphalia, Germany, have invented certain new and useful Improvements in the Art or Process of Manufacturing Bolts, Rivets, and Similar Articles, of which the following is a specification.

My invention relates to improvements in the art or process of manufacturing bolts, rivets and similar articles by means of machinery working rods of suitable material, heated to their entire lengths, into such articles.

In the process in vogue heretofore such a machine would cut off pieces of uniform, predetermined lengths from a rod in hot condition, as mentioned, and would feed such pieces in and through the cylindrical bore of a die or matrix which would embrace so much of each bolt as was intended for the shank, while a blank would be left to protrude from the other end of the bore against which a punch would be operated in axial direction, upset such blank and thus form the bolt or rivet head. The force by which the punch would operate would, however, at the same time cause a not inconsiderable jumping of the shank of such bolt or rivet within the matrix, pressing the shank tight against the inside of the latter, and the consequence would be disturbances, liable to arise from the often considerable resistance offered by the shank thus squeezed-in to the action of the ejector provided for the removal of the finished article. With a view of overcoming this difficulty the employment of matrices has been recommended, consisting of corresponding counterparts which would open a little shortly before the finished bolt was ejected. The trouble with matrices of this kind is, however, that the shank and the lower face of the head of the finished article shows seams or ridges in the joint of these counterparts.

Now, the object of my invention is to devise a method permitting the manufacture of articles of the class referred to out of a heated rod without the liability of the shank of a bolt or rivet being pressed-on against the inside of the matrix and without the necessity of employing matrices composed of a plurality of composite parts.

The essential feature of my new method is the refrigeration of the shank of the article previous to the shaping or upsetting of the head. By this way the shank becomes hard and, as a consequence, when the upsetting is being done, it will no more be jumped to any considerable extent and, accordingly, a pressing-on of the same against the inside of the matrix will with certainty be avoided. The refrigeration of the shank may be effectuated before the article to be shaped is cut off from the rod or immediately before it is put into the matrix or even when it is within the latter.

Figure 2:
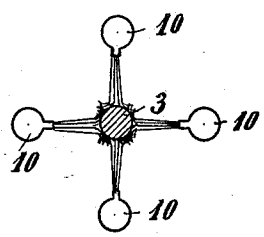

On the drawing herewith the carrying out of my process is illustrated in connection with a mechanism for the manufacture of bolts or rivets, Figure 1 being a diagram in horizontal section of the said mechanism and of a cooling device as required in carrying out my new process, while Fig. 2 is a diagram in transverse section, on an enlarged scale, showing the working of the said refrigerating device.

Only so much of the machine is shown as is necessary for the understanding of my invention.

By means of suitable feeding members, as, for instance, rollers 1 and 2, the rod 3, heated to its entire length, is, as known heretofore, intermittently pushed forward at uniform rate and for certain predetermined distances corresponding with the length of the article to be manufactured and conducted between the cutters or shears 4 until held up by the stop 5. The portion thus pushed forward is thereupon cut off by means of the blade 6 and by the mechanism of the machine or otherwise brought in alinement with one end of the bore of the matrix 7. By means of the punch 8, then operated, the bolt is inserted into the matrix until so much is in the same as corresponds with the intended length of the shank, whereupon the further movement of the punch 8 upsets the blank end permitted to protrude and thus forms the head of the bolt or rivet. When this has been done, the punch returns again and the finished bolt is pushed out of the matrix by the ejector 9.

As a means of carrying out my invention the drawings shows further a set of tubes 10 which is so disposed in front of the shear-blades 4 that it encircles the road of the feed, the end portions of the several tubes 10 being perforated with sprinkle-holes to such a length and so disposed that each time when the feed 3 stops the shank portion of the bolt intended to be passed between the shears is faced by and between the said perforations. The tubes 10 are communicating with a main tube 11 through which a suitable cooling means as, for instance, water, may be supplied. In the drawing there is shown also a valve 12 which is so controlled relative to the movement of the feed that, when the movement of the feed pauses, the refrigerating means is admitted into the tubes 10 and is through the aforesaid perforations sprinkled against that portion of the feed which is to form the shank of the bolt next to be cut off, while the supply of the cooling means is interrupted during the forward movement of the feed. Thus during each pause in the movement of the feed the shank portion of the bolt getting into the cutting device with the next forward movement becomes refrigerated while when the forward movement goes on again, the refrigeration is self-actingly interrupted until the feed touches the stop 5. The forward movement being thus finished the refrigeration of the shank of the next following bolt begins. At the same time the forwarded bolt is cut off by means of the cutter 6 and brought in face of the orifice of the matrix 7 into which it is pushed to the length of the intended shank by the punch 8 whereupon the upset follows. The portion of the bolt thus placed into the matrix having by the described way been considerably refrigerated, is prevented from becoming jumped by the force of the punch 8 when the head is being upset. Accordingly it does not stick fast within the matrix, but can easily be pushed out of the latter by the ejector 9. An interruption of work, heretofore so frequently occurring is thus entirely avoided.

I claim:—

1. A process in the manufacture of bolts, rivets and similar articles out of rods heated to their entire lengths consisting of refrigerating the shank portion of the intended article previous to the upsetting of the head of such article.

2. The herein described process in the manufacture of bolts, rivets and similar articles consisting of cutting uniform pieces from a feed rod heated to its entire length, bringing them in face of the orifice of a matrix, inserting so much into the said matrix as is intended for a shank, upsetting the head of the bolt, and of refrigerating during the pauses of the feeding movement the shank-portion of the article in advance of the cutting operation by sprinkling a refrigerating liquid on said shank.

In testimony whereof, I have signed my name to this specification in the presence of two subscribing witnesses.

HANS MÜLLER. [L. S.]

Witnesses:
 HELEN NUFER,
 C. A. NUFER.

---

Copies of this patent may be obtained for five cents each, by addressing the "Commissioner of Patents, Washington, D. C."